May 28, 1963  W. M. HINDMAN  3,091,124
MEASURING PIPET
Filed Nov. 2, 1960  2 Sheets-Sheet 1
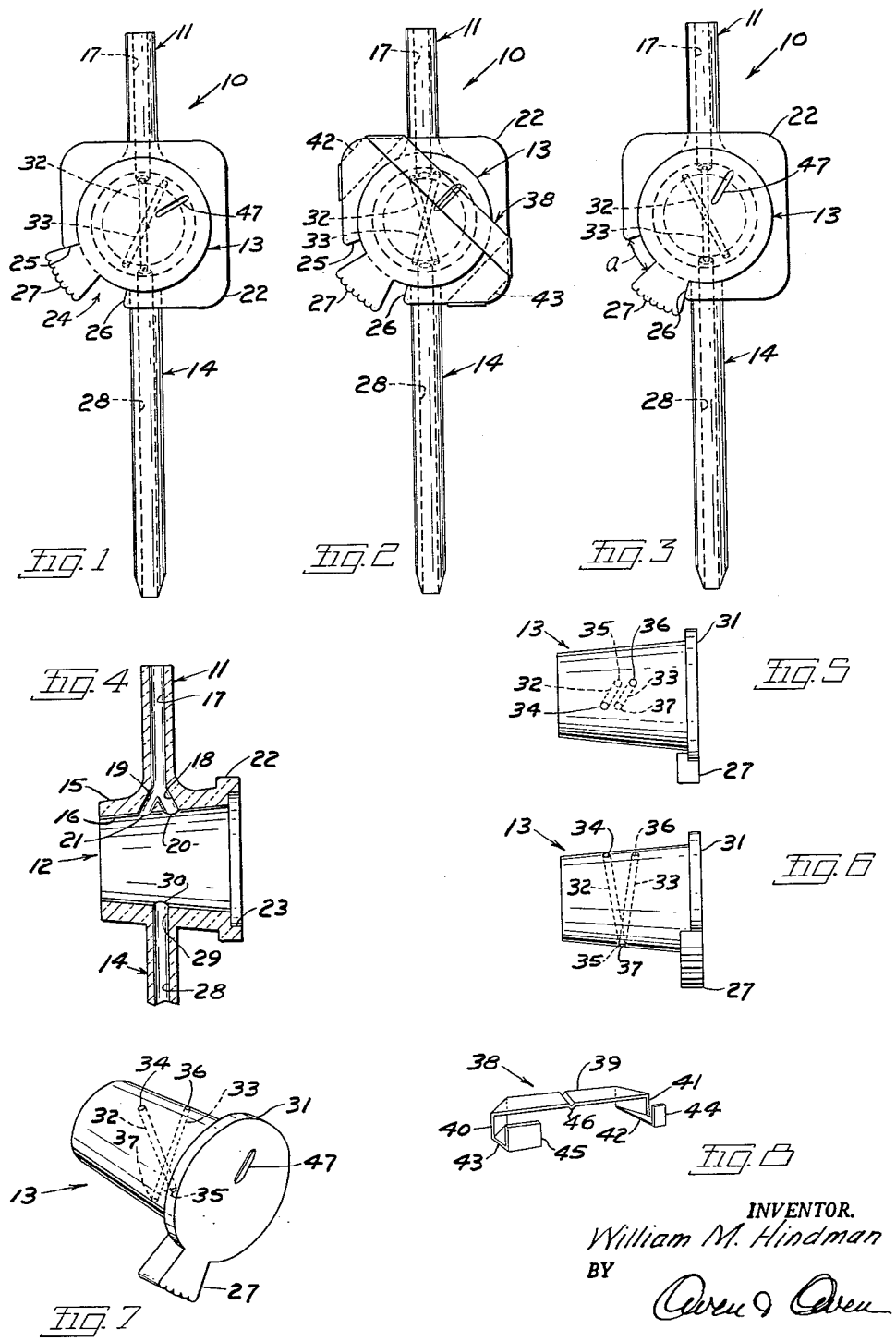
INVENTOR.
William M. Hindman
BY May 28, 1963 W. M. HINDMAN 3,091,124
MEASURING PIPET Filed Nov. 2, 1960 2 Sheets-Sheet 2

INVENTOR.
WILLIAM M. HINDMAN
BY Owen + Owen
ATTORNEYS

United States Patent Office 3,091,124
Patented May 28, 1963

3,091,124
MEASURING PIPET
William M. Hindman, 702 S. Magnolia, Tucson, Ariz.
Filed Nov. 2, 1960, Ser. No. 66,766
10 Claims. (Cl. 73—425.4)

This invention relates to a measuring pipet and, more particularly, relates to a measuring pipet for obtaining and delivering small amounts of fluid of known volume with a high degree of precision and reproducibility.

Many analytical laboratory procedures involve the obtaining and delivery of small, predetermined quantities of fluid. For example, in preparing exact dilutions in the medical laboratory for hematologic and blood chemistry tests, it is extremely important that an accurate volume of blood be transferred to the diluent fluid. In this respect, various types of measuring pipets have previously been proposed for use in such applications. In general, however, only the simple stem pipets, calibrated to a mark, have found favor to any significant extent, due chiefly to numerous disadvantages inherent in the other proposed types, not the least of which is expense. In this same respect, although the simple stem pipets are used extensively, the need for an improved fluid measuring device is nonetheless great due to the occurrence of several sources of inaccuracy with the employment of such pipets. For example, the degree of precision and reproducibility obtained with the use of such pipets is severely hampered by unavoidable slight variations inherent when attempting to draw fluid samples visually to a mark. Furthermore, the operator or technician employing the pipet often overshoots the mark which necessitates careful manipulation of the fluid level back to it. This manipulation is made very difficult in many situations due to the tendency of viscous fluids to adhere to the sides of the pipet bore above the mark resulting in obscuring the mark and thereby making visual measurement extremely difficult. In addition, of course, this fluid adhering above the mark contributes to the inaccuracy of the measured quantity of fluid itself. Still further, when an open stem pipet is used, the exterior of the tip thereof is usually wiped hastily and possibly incompletely when, for example, transferring the fluid into a volume of diluent, because of the possibility that the wiping material may act to withdraw some of the fluid from the capillary bore by absorption.

It is, therefore, the principal object of the invention to provide an improved measuring pipet.

It is a further object of the invention to provide a relatively simple yet highly effective pipet which is extremely accurate and easy to operate.

Another object of the invention is the provision of a portable measuring pipet which is capable of repeated, precise reproductions of a measured charge or volume of fluid.

More particularly, it is a still further object of the invention to provide a simpling or measuring pipet which includes the employment of a three-way stop-cock and a calibrated pipet tip bore which are so disposed as to enable an operator to draw a measured quantity of fluid therein when the stop-cock is in a first position, transfer the fluid without fear of loss thereof when the stop-cock is in a second position, and deliver the measured charge of fluid to a desired vessel when the stop-cock is in still another or third position.

Other objects and advantages of the invention will in part by apparent, and will in part appear hereinafter.

For a better understanding of the nature and object of the invention, reference should be had to the following detailed description and accompanying drawings, in which:

FIG. 1 is a view in front elevation of a measuring pipet embodying the present invention, and showing the stop-cock in a first or fill position;

FIG. 2 is a view in front elevation of the measuring pipet illustrating the stop-cock intermediate position employed when transferring the filled pipet, and additionally illustrating the position of the stop-cock plug spring retaining clip on the barrel;

FIG. 3 is a view in front elevation of the measuring pipet in accordance with the invention and showing the stop-cock plug in another or discharge position;

FIG. 4 is a vertical sectional view through the barrel, stem and tip of the pipet, with the stop-cock plug removed;

FIG. 5 is a top plan view of a stop-cock plug in accordance with the invention;

FIG. 6 is a view in side elevation of the stop-cock plug;

FIG. 7 is a view in perspective of a stop-cock plug in accordance with the invention;

FIG. 8 is a view in perspective of the stop-cock plug retaining clip in accordance with the invention;

Figure 9:
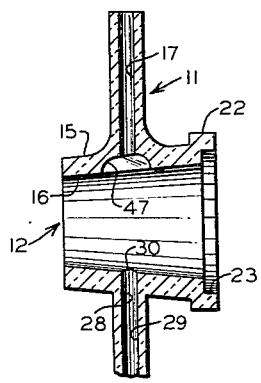
FIG. 9 is a vertical sectional view through the barrel, stem and tip of a pipet illustrating another embodiment thereof in accordance with the invention.

In general, the measuring pipet in accordance with the invention comprises a stock-cock having a barrel shaped body with a rotatable stop-cock plug removably mounted therein, a stem extending radially away from the barrel and having a bore therethrough which communicates with the interior surface of the barrel, a hollow pipet tip extending oppositely from the step and having a bore leading to an aperture through the barrel wall on the side of the barrel opposite to the stem, and a spring clip which retains the stop-cock plug in place.

The stop-cock plug has a pair of bores which extend generally diametrically therethrough and are angularly disposed with relation to each other, and which cooperate with the stem and tip bores in such a manner that one of the stop-cock bores connects the pipet tip to the stem bore when the stop-cock plug is in a first position, the other of the stop-cock plug bores connects the pipet tip to the stem bore when the stop-cock plug is in a third position, and neither of the bores communicates with the stem bore or the tip bore when the plug is in an intermediate or second position.

In this respect, according to a first embodiment of the invention, the stem bore communicates with an axially elongated area in the interior surface of the barrel, which opening area may comprise a single elongated groove, or a pair of axially spaced, separate openings. According to a second embodiment, the stem bore directly enters the interior surface of the barrel, and the outer surface of the stop-cock plug is provided with a pair of grooves or channels extending axially inwardly from each of two adjacent bore openings therein, which openings are oppositely, axially and circumferentially offset from the stem bore.

Referring now to the drawings, and particularly to the embodiment illustrated in FIGS. 1–8, reference numeral 10 indicates generally a measuring pipet in accordance with the invention. The pipet 10 comprises a stem 11, a barrel indicated generally at 12, a stop-cock plug indicated generally at 13, and a pipet tip 14. The barrel 12, stem 11, and tip 14 of the pipet are all preferably constructed of "Pyrex" glass or other transparent material with a low temperature coefficient of expansion and a high degree of resistance to breakage. The stop-cock plug 13 may also be constructed of "Pyrex" glass, or of "Teflon" or similar material.

The barrel 12 is hollow, as best shown in FIG. 4, and is generally tubular in shape. In the particular embodiment, the barrel 12 is shaped like a truncated cone with both the outer surface 15 and the bore 16 thereof preferably tapered at an angle of approximately 7 degrees from base to apex. The stem 11 is also hollow to provide a bore 17 therethrough, which bore communicates with an axially elongated opening area in the interior surface of the barrel, which opening area, in the embodiment of FIGS. 1-8, is formed by the branching of the bore 17 into two channels 18 and 19 which terminate at the interior of the barrel 12 in a pair of axially spaced openings 20 and 21. In this embodiment additionally, the openings 20 and 21 are aligned so that each is located in a vertical plane which includes the axis of the barrel 12 and the axis of the stem bore 17.

The barrel 12 has a generally rectangular flange 22 extending radially outwardly from its larger end and a circular recess 23 is formed at the larger end of the bore 16. One corner of the flange 22 is cut away to provide an arcuate opening 24 defined by shoulders 25 and 26, which opening is adapted to receive a thumb piece 27 of the stop-clock plug 13 when the plug 13 is in place in the barrel 12.

The pipet tip 14 extends downwardly from the barrel 12 and has a bore 28 therethrough which communicates with the interior of the barrel 12 through a channel 29 in the barrel wall and an opening or aperture 30 in the inner surface thereof. In the embodiment illustrated in FIGS. 1-8, the axes of the bore 28, channel 29 and aperture 30 are all located in the vertical plane which includes the barrel axis and the axis of the bore 17. The diameters of the bore 28 and the channel 29 are preferably the same and uniform throughout their lengths, with the combined length of the bore 28 and the channel 29 and the diameter being selected so that the bore 28 and channel 29 hold an exact volume of fluid.

The stop-cock plug 13 is formed generally to mate with the shape of the barrel 12; in the illustrated embodiment, it also being shaped as a truncated cone, the outer surface thereof mating to the inner surface of the barrel 12. The fit must be exact so as to prevent any fluid from escaping, for example, through the aperture 30 between the inner surface 16 of the barrel and the outer surface of the plug 13. As best shown in FIG. 7, an annular lip 31, having the same thickness as the depth of the recess 23 in the flanged portion 22 of the barrel 12 and a just slightly smaller diameter than that of the recess 23, extends radially outwardly from the base of the stop-cock plug 13. The lip 31 fits into the recess 23 for rotation therein when the stop-cock plug 13 is inserted in the barrel 12 and, being of a thickness exactly equal to the depth of the groove 23, provides a smooth continuous surface with the outer surface of the flange 22. The thumb piece 27 extends outwardly beyond the lip 31 and projects through the opening 24 in the flange 22 when the stop-cock plug 13 is positioned in the barrel.

A pair of bores 32 and 33 extend generally diametrically through the stop-cock plug 13 and are angularly disposed in relation to each other. The bore 32 terminates at the surface of the stop-cock plug 13 in openings 34 and 35, while the bore 33 connects surface openings 36 and 37. The openings 34 and 36 are axially spaced from each other along the surface of the plug 13 a distance equal to the spacing between the openings 20 and 21 and are additionally circumferentially offset from each other the same number of degrees as the circumferential extent "a" (see FIG. 3) of the opening or gap 24 ("a" indicating the number of degrees between the shoulders 25 and 26 minus the circumferential extent in degrees of the thumb piece 27). The openings 35 and 37 are circumferentially offset from each other the same distance as are the openings 34 and 36, and lie in a common plane which is normal to the axis of cock plug 13.

When the stop-cock plug 13 is rotated to the position illustrated in FIG. 1 by moving the thumb piece 27 against the shoulder 25 of the flange 22, the bore 32 connects the stem opening 21 to the tip opening 30. When the thumb piece 25 is rotated counterclockwise to its lower (third) position against the shoulder 26 of the flange 22, the bore 33 connects the stem opening 20 to the tip opening 30. In the first position (FIG. 1), the ends of the bore 33 are closed off by the inner surface 16 of the barrel 12. In second or intermediate position (FIG. 2), both of the bores 32 and 33 are closed off. In third position (FIG. 3), the ends of the bore 32 are similarly closed off.

The stop-cock plug 13 is held securely in the barrel 12 by a spring retaining clip indicated generally at 38 (see FIG. 8). The clip 38 is bent from a thin strip of spring steel or the like and is adapted to be snapped in place over the flange 22 of the barrel 12. The clip 38 comprises a base 39 which is of a length sufficient to extend diagonally across the front surface of the flange 22 at a position just short of a full diagonal thereof (see FIG. 2). The ends of the base 39 are angularly bent downwardly to form a pair of side bars 40 and 41 which extend across the flange 22 at an angle of 90 degrees to the base 39. The ends of the side bars 40 and 41 are, in turn, angularly bent at the rear of the flange 22 to form a pair of legs 42 and 43 which extend across the back surface of the flange 22 parallel to and spaced from the base 39. Finally, the ends of the legs 42 and 43 are bent up toward the base 39 at an angle of 90 degrees thereto, to form catches 44 and 45. The clip 38 is sprung open and then snapped in place around the flange 22 to bear against the end of the plug 13 to retain it in the body 12. The base 39 is cross-crimped at about the center to form a ridge 46. The ridge 46 is adapted to register in a radially extending groove 47 in the end of the stop-cock plug 13 when the plug is rotated to the intermediate position shown in FIG. 2 in order to retain it in such position. It should be noted that although the spring clip 38 is only shown in position on the flange 22 in FIG. 2, it would be so positioned at all times during use of the pipet 10, the clip 38 not being shown in FIGS. 1 and 3 for purposes of clarity in better illustrating the other components of the pipet 10.

In a preferred embodiment of the measuring pipet in accordance with the invention, the bores 32 and 33 through the stop-cock plug 13 have smaller diameters than the bore 28 through the pipet tip 14. This facilitates the use of the pipet 10 in a manner which will now be explained more fully.

In operating the pipet in accordance with the invention, a rubber tube (not shown) is first fitted onto the stem 11 so as to enable the operator or technician to apply mouth suction thereto. The stop-cock plug 13 is then rotated in a clockwise direction to the farthest extent possible, i.e. until the thumb piece 27 abuts the shoulder 25 (FIG. 1) to place the stem 11 and tip 14 in communication through the bore 32. The pipet tip 14 is then immersed in the fluid of which it is desired to take a sample and suction applied to the rubber tube. The suction draws the fluid upwardly into the pipet tip bore 28. When the level of the fluid reaches the aperture 30, the technician is aware of this fact by visual inspection and, preferably, also through the sensation of increased resistance to suction which results when the fluid passes into the smaller bore 32 of the stop-cock plug 13. As previously mentioned, it is preferred that the stop-cock plug bores be of a slightly smaller diameter than the pipet tip bore, and it is because of the desirability of this increased resistance to suction in aiding the operator in determining when the pipet tip is full, that such embodiment is preferred.

When the fluid completely fills the bore of the pipet tip 14, the stop-cock plug 13 is rotated counterclockwise by the thumb piece 27 until the ridge 46 snaps into registry with the radial groove 47 as illustrated in FIG. 2. It should be noted that the stop-cock plug 13 should not be rotated to the intermediate position of FIG. 2 until the fluid level extends into the bore 32 and that the fluid not be drawn all the way through the bore 32 before rotation of the plug 13 to the position of FIG. 2. When the plug 13 is rotated to the intermediate position, the exact amount of fluid, as determined by the length and diameter of the bore 28 and the channel 29, is cut off and held in the pipet tip bore, while any additional fluid in the stop-cock bore 32 remains caught therein. The pipet tip may then be wiped off and cleaned without fear of the cleaning tissue absorbing any of the fluid from the pipet tip bore.

The stop-cock plug 13 is maintained in the FIG. 2 position until the pipet tip 14 is positioned over the container into which it is desired to empty the quantity of measured fluid. At this point, the operator again rotates the plug counterclockwise until the thumb piece 27 abuts the shoulder 26. As previously mentioned, when the stopcock plug is in this position (FIG. 3), the bore 33 connects the tip 14 to the stem 11. It is only necessary then to blow on the rubber tube attached to the stem 11 in order to discharge the measured charge of fluid. The operator can then wash out the pipet by drawing the prepared dilution, into and out of the tip 14 to assure complete transfer of all the measured fluid charge.

It will be noted that the excess fluid is still trapped in the bore 32 of the stop-cock plug 13 when it is in the position of FIG. 3 and therefore does not interfere with the delivery of the measured fluid charge. After the pipet tip is rinsed as above described, the plug 13 may then be rotated clockwise back to the position of FIG. 1 and again rinsed to rid the bore 32 of the excess fluid. The pipet is then ready to be used again.

In the embodiment illustrated in FIG. 9, the axially elongated opening area in the interior surface 16 of the barrel 12, and with which the stem bore 17 communicates, is merely a single axially extending groove or channel 47 of the same length as the distance between and including the openings 20 and 21 in the embodiment of FIGS. 1–8. The groove 47 is preferably also of the same diameter as the bore 17 and the channels 18 and 19. In this manner then, a generally T-shaped passageway from the interior surface of the barrel up to the stem bore is established instead of the generally Y-shaped passageway illustrated in FIGS. 1–8, and particularly in FIG. 4. It will be appreciated that the barrel, stem and tip portions of the pipet illustrated in FIG. 9, as well as the stopcock plug used therewith, are, in all other details of construction, the same as in the embodiment of FIGS. 1–8 and that both function substantially identically in the operation of the pipet, as previously described.

Figure 10:
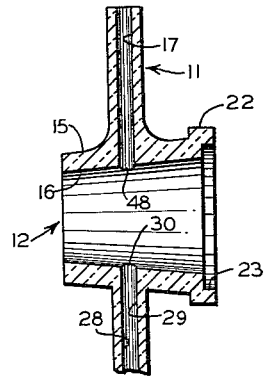
FIG. 10 is a vertical sectional view through the barrel, stem and tip of a pipet illustrating still another embodiment thereof in accordance with the invention.
Figure 11:
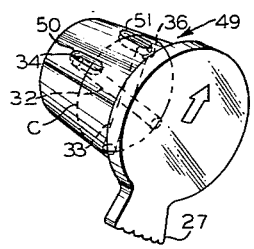
FIG. 11 is a view in perspective of a stop-cock plug adapted for use with the barrel illustrated in FIG. 10.
Figure 12:
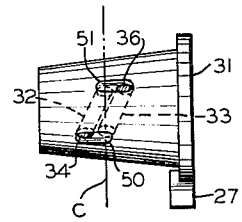
FIG. 12 is a top plan view of the stop-cock plug illustrated in FIG. 11.

In the embodiment of FIGS. 10–12, the stem bore 17 directly enters the interior surface of the barrel 12 in a single opening or aperture 48 of essentially the same diameter as that of the bore. The stop-cock plug 49 for use with this barrel embodiment in accordance with the invention is similar in all respects with the plug illustrated in FIGS. 5–7 except that grooves or channels 50 and 51 are provided in the exterior surface thereof and extend axially inwardly from each of the openings 34 and 36, respectively, of the bores 32 and 33. The grooves 50 and 51 extend inwardly from the openings 34 and 36 a distance slightly greater than the axial distance of these openings from the stem bore aperture 48 (assuming the stop-cock plug is seated in the barrel) whereby the inner ends thereof overlap in an axial direction with a portion of each groove lying in a plane normal to the axis of the plug and which includes the axis of the stem bore and the opening 48. The lower ends of the spaced and angularly offset bores 32 and 33 terminate on the same diametral plane through the plug 49, which plane, of course, intersects the tip aperture 30. This diametral plane is indicated by circle C in FIG. 11, and plane C in FIG. 12. It will thus be appreciated that when the stop-cock plug 49 is rotated to the position of the plug 13 in FIG. 1, the bore 32, through the groove 50, connects the stem opening 48 to the tip aperture 30. When the stop-cock plug 49 is then rotated counterclockwise to the position of the plug 13 in FIG. 3, the bore 33, through the groove 51, connects the stem opening 48 to the tip aperture 30. Similarly, when the stop-cock plug 49 is in the position of the plug 13 in FIG. 2, neither of the grooves 50 or 51, and thereby the bores 32 or 33, are in communication with the opening 48 or the aperture 30.

It will now be apparent that a highly effective and substantially foolproof measuring pipet is provided by the present invention, which pipet fulfills all of the objects previously set forth as being desirable in such instruments. Further, while what has been described are considered to be the more advantageous embodiments of the invention, it is apparent that many modifications and variations can be made in the specific arrangement and disposition of the parts without departing from the spirit of the present invention. Such modifications and variations are considered to be within the purview and scope of the invention as defined by the appended claims.

This application is a continuation-in-part of my copending application, Serial No. 48,711 filed August 10, 1960, now abandoned.

I claim:

1. A measuring pipet comprising a body including a barrel and a stopcock plug, said barrel and said plug having cooperating mating interior and exterior surfaces, respectively, a stem extending outwardly from said barrel and having a bore therethrough which communicates with the interior surface of said barrel, a pipet tip extending away from said barrel and having a bore therethrough which communicates with the interior surface of said barrel in diametrically-opposed relation to said stem bore, said stopcock plug having a pair of plug bores extending therethrough, each of which intersects an axis of said plug, said plug bores being spaced axially apart along said plug at the portions intersecting said plug axis, passage means in one of said plug and barrel connecting an end of one of said plug bores to one of said stem bore and said pipet tip bore when said plug is in one circumferential position and connecting an end of the other of said plug bores to the same one of said stem bore and said pipet tip bore when said plug is in a second circumferential position, both of said plug bores being out of registry with both said stem bore and said pipet tip bore when said stopcock is in a third circumferential position.

2. A pipet comprising a body including a barrel and a stopcock plug, said barrel and said plug having cooperating mating interior and exterior surfaces respectively, a stem extending outwardly from said barrel and having a bore therethrough which communicates with the interior surface of said barrel, a pipet tip extending away from said barrel and having a bore therethrough which communicates with the interior surface of said barrel in circumferentially-spaced relation to said stem bore, said stopcock plug having two plug bores extending therethrough with planes through said plug bores parallel to an axis of said plug intersecting one another, with the closest portions of said plug bores being separated axially of said plug, and passage means in one of said plug and said barrel connecting an end of one of said plug bores to one of said stem bore and said pipet tip bore when said plug is in first circumferential position, and connecting an end of the other plug bore to the same one of said stem bore and said pipet tip bore when said plug is in a second circumferential position, both of said plug bores being out of registry with both said stem bore and said pipet tip bore when said stopcock plug is in a third circumferential position.

3. A measuring pipet according to claim 2 wherein said plug bores lie in parallel planes.

4. A measuring pipet according to claim 2 and a generally radial flange on said barrel, a spring retaining clip embracing said flange and extending across the end of said barrel and a relatively flat face on said plug normal to the axis of rotation thereof and bearing against said retaining clip.

5. A measuring pipet according to claim 2 and an indexing means for releasably retaining said plug in a third circumferential position intermediate said first and said second circumferential positions.

6. A measuring pipet according to claim 5 in which said index means comprises a clip for retaining said plug in said bore and a cooperating element on said plug.

7. A measuring pipet for the extraction and delivery of a measured quantity of fluid comprising a body including a barrel and a stop-cock plug, said barrel and said plug having cooperating mating interior and exterior surfaces, respectively, a stem extending outwardly from said barrel and having a bore therethrough communicating with an axially elongated opening area in the interior surface of the barrel, a pipet tip extending away from said barrel and having a bore therethrough connecting with an aperture through the wall of said barrel in circumferentially spaced relation to said axially elongated opening area, said stop-cock plug having a pair of generally diametrically extending bores therethrough which are angularly disposed in relation to each other and the end of said bores are so spaced such that a different one of said stop-cock bores connects said axially elongated opening area with said aperture in each of two positions of said stop-cock plug, and both bores are out of registry with both said axially elongated opening area and said aperture when said stop-cock is in a third position.

8. A measuring pipet comprising a body and a stop-cock plug, said barrel and said plug having cooperating mating interior and exterior surfaces, respectively, a stem extending outwardly from said barrel and having a single bore therethrough communicating with a pair of axially spaced openings through the wall of said barrel, a pipet tip extending away from said barrel and having a bore therethrough connecting with a third opening through the wall of said barrel in circumferentially spaced relation to said pair of axially spaced openings, said stop-cock plug having a pair of generally diametrically extending bores therethrough which are angularly disposed with relation to each other and the ends of said bores are so spaced such that one of said stop-cock bores connects said third opening to one of said pair of openings when said stop-cock plug is in a first position, and the other of said stop-cock bores connects said third opening to the other one of said pair of openings when said stop-cock plug is in a remote position.

9. A measuring pipet comprising a body including a barrel and a stop-cock plug, said barrel and said plug having cooperating mating interior and exterior surfaces, respectively, a stem extending outwardly from said barrel and having a bore therethrough which communicates with the interior surface of the barrel, a pipet tip extending away from said barrel and having a bore therethrough connecting with an aperture through the wall of said barrel in circumferentially spaced relation to said stem bore, said stop-cock plug having a pair of generally diametrically extending bores therethrough which are angularly disposed with relation to each other, one end of each of said plug bores opening into the barrel adjacent to but oppositely, axially and circumferentially offset from said stem bore, a pair of axially elongated grooves in the exterior surface of said stop-cock plug, one of which grooves extends from each of said one end of said stop-cock plug bores in an opposite axial direction toward said stem bore, a portion of each of said grooves lying in a plane normal to the axis of the stop-cock plug and which includes the axis of the stem bore, the other ends of said stop-cock bores being so spaced such that a different one of said stop-cock bores connects said stem bore with said aperture through a different one of said grooves in each of two positions of said stop-cock, and both bores are out of registry with both said stem bore and said aperture when said stop-cock plug is in a third position.

10. A measuring pipet comprising a body including a barrel and a stop-cock plug, said barrel and said plug having cooperating mating interior and exterior surfaces, respectively, a stem extending outwardly from said barrel and having a bore therethrough which communicates with the interior surface of the barrel, a pipet tip extending away from said barrel and having a bore therethrough connecting with an aperture through the wall of said barrel in circumferentially spaced relation to said stem bore, said stop-cock plug having a pair of generally diametrically extending bores therethrough which are angularly disposed with relation to each other, one end of each of said plug bores opening into the barrel adjacent to but oppositely, axially and circumferentially offset from said stem bore, a pair of axially elongated grooves in the exterior surface of said stop-cock plug, one of which grooves extends from each of said one end of said stop-cock plug bores in an opposite axial direction toward said stem bore, a portion of each of said grooves lying in a plane normal to the axis of the stop-cock plug and which includes the stem bore, the other end of each of said stop-cock bores being so spaced such that a different one of said stop-cock bores connects said stem bore with said aperture through a different one of said grooves in each of two positions of said stop-cock, and both bores are out of registry with both said stem bore and said aperture when said stop-cock plug is in a third position.

References Cited in the file of this patent

UNITED STATES PATENTS

| | | |
|---|---|---|
| 1,204,368 | Lowy | Nov. 17, 1916 |
| 2,830,738 | Sorg et al. | Apr. 15, 1958 |

FOREIGN PATENTS

| | | |
|---|---|---|
| 109,753 | Great Britain | Sept. 27, 1917 |